April 8, 1930.                F. F. MANOR                 1,753,612
                       TANDEM WHEELED AIRCRAFT
                         Filed July 23, 1927
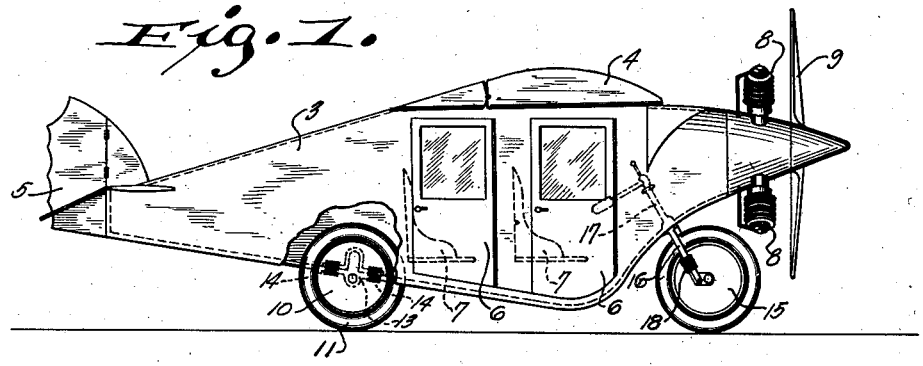
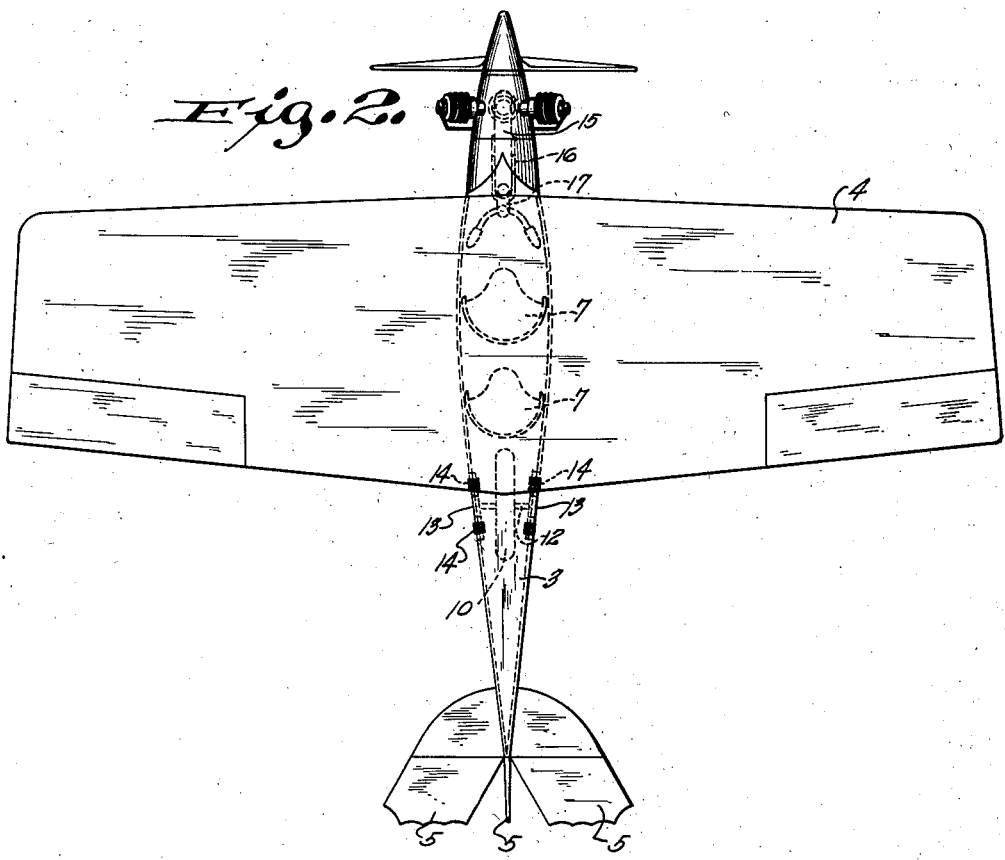
INVENTOR.
Florian F. Manor,
BY Morsell, Keeney & Morsell
ATTORNEYS Patented Apr. 8, 1930

1,753,612

UNITED STATES PATENT OFFICE

FLORIAN F. MANOR, OF OSHKOSH, WISCONSIN

TANDEM-WHEELED AIRCRAFT

Application filed July 23, 1927. Serial No. 207,965.

My invention has relation to improvements in tandem wheeled aircrafts.

It is one of the objects of the present invention to provide an aircraft having two wheels in tandem arrangement instead of having two wheels mounted on the same axle as commonly used.

It is a further object of this invention to provide an aircraft which can take off or land in an ordinary street or in any narrow or ordinarily difficult place.

It is a further object of this invention to provide an aircraft which can be driven along the street like an ordinary motorcycle until it is desired to ascend.

It is a further object of this invention to provide an aircraft which is lighter in weight due to the simple, tandem wheel arrangement and therefore easier to handle.

It is a still further object of this invention to provide an aircraft which is simple in construction, and which is well adapted for the purpose described.

With the above and other objects in view, the invention consists of the improved tandem wheeled aircraft and all its parts and combinations as set forth more fully in the following description and in the claim, and all equivalents thereof.

In the accompanying drawing:

Fig. 1 is a side elevation of the improved tandem wheeled aircraft, part of the body being broken away; and Fig. 2 is a plan view thereof.

Referring to the drawing the numeral 3 designates the body portion which is equipped with the usual wings 4 and rudder 5. Doors 6 in the body give access to the seats 7 within. The numeral 8 designates the projecting cylinders from the motor, and the numeral 9 designates the propeller. The rear wheel 10 is equipped with the usual tire 11 and is mounted upon an axle 12, the ends of which are connected to the frame at 13. Resilient members 14, preferably constructed of rubber, absorb the shock caused in landing or in riding over rough surfaces. An opening in the lower portion of the body accommodates part of the wheel. The front wheel 15 is similar to the front wheel of a motorcycle and is mounted in a forked frame member 16 connected with a steering means 17. The front wheel is also resiliently mounted, resilient members 18 absorbing the shock upon the front wheel produced in landing or in riding over rough surfaces.

From the foregoing description it can be seen that the tandem wheel arrangement is of very simple construction, that it greatly facilitates the handling of the plane and that it makes it possible for the plane to be used on landing surfaces of very limited width.

What I claim as my invention is:

In an airplane capable of sustained flight, the combination of a body portion having an opening in the lower part thereof toward the rear of the body and having the lower part of the front curved upwardly and outwardly for a substantial distance, a single wheel mounted in the rear opening, a single steerable front wheel projecting from the upwardly curved front portion, and a driving motor and propeller carried by the outwardly curved front portion in advance of the front wheel.

In testimony whereof, I affix my signature.

FLORIAN F. MANOR.